(12) United States Patent
Miller et al.

(10) Patent No.: US 6,730,348 B2
(45) Date of Patent: *May 4, 2004

(54) SLURRIED CONFECTION PREPARATION AND FLAVOR-INJECTED BLENDING SYSTEM AND METHOD

(76) Inventors: Eric R. Miller, 126 Interlake Dr., Deland, FL (US) 32724; William Brown, 7223 Jaffrey Ct., Orlando, FL (US) 32835

( * ) Notice: Subject to any disclaimer, the term of this patent is extended or adjusted under 35 U.S.C. 154(b) by 360 days.

This patent is subject to a terminal disclaimer.

(21) Appl. No.: 09/930,090

(22) Filed: Aug. 15, 2001

(65) Prior Publication Data

US 2002/0048626 A1 Apr. 25, 2002

Related U.S. Application Data

(63) Continuation of application No. 09/532,482, filed on Mar. 22, 2000, now abandoned, and a continuation of application No. 09/650,980, filed on Aug. 29, 2000, now abandoned, which is a continuation of application No. 09/370,516, filed on Aug. 6, 1999, now Pat. No. 6,068,875, which is a continuation of application No. 09/114,611, filed on Jul. 13, 1998, now Pat. No. 6,126,983, which is a continuation of application No. 09/097,111, filed on Jun. 12, 1998, now Pat. No. 5,948,461, which is a continuation of application No. 08/904,075, filed on Jul. 31, 1997, now Pat. No. 5,778,761, which is a continuation of application No. 08/695,238, filed on Aug. 8, 1996, now Pat. No. 5,653,157, which is a continuation of application No. 08/451,256, filed on May 26, 1995, now Pat. No. 5,766,665.

(51) Int. Cl.⁷ ................................................. A23G 9/00
(52) U.S. Cl. ........................ 426/565; 426/519; 426/569; 426/590
(58) Field of Search ............................... 426/565, 519, 426/569, 590; 99/516; 366/197, 198, 204, 289, 347; 222/444.5

(56) References Cited

U.S. PATENT DOCUMENTS

| | | |
|---|---|---|
| 1,681,929 A | 8/1928 | De Armond et al. |
| 1,957,391 A | 5/1934 | Costakos |
| 2,051,883 A | 8/1936 | Morgan |
| 2,462,019 A | 2/1949 | Bowman |
| 2,707,911 A | 5/1955 | Charpiat |
| 2,712,887 A | 7/1955 | King |
| 2,736,274 A | 2/1956 | Atkins |
| 2,765,234 A | 10/1956 | Schmitt et al. |
| 2,855,007 A | 10/1958 | Erickson et al. |
| 3,106,895 A | 10/1963 | Hood |
| 3,276,633 A | 10/1966 | Rahauser |
| 3,295,997 A | 1/1967 | Tomlinson et al. |
| 3,460,717 A | 8/1969 | Thomas |
| 3,830,407 A | 8/1974 | Wierlo |
| 3,934,759 A | 1/1976 | Giannella et al. |
| 3,987,715 A | 10/1976 | Muller |
| 4,580,905 A | 4/1986 | Schwitters et al. |
| 4,822,175 A | 4/1989 | Barnard et al. |
| 4,828,866 A | 5/1989 | Wade et al. |
| 4,881,663 A | 11/1989 | Seymour |
| D305,973 S | 2/1990 | Barnard et al. |
| D309,399 S | 7/1990 | Barnard et al. |
| D309,400 S | 7/1990 | Barnard |
| 4,946,287 A | 8/1990 | Barnard et al. |
| 4,988,529 A | 1/1991 | Nakaya et al. |
| 5,056,686 A | 10/1991 | Jarrett |
| 5,152,429 A | 10/1992 | Billings |
| 5,159,818 A | 11/1992 | Etou et al. |
| 5,203,366 A | 4/1993 | Czeck et al. |
| 5,251,790 A | 10/1993 | Cohn et al. |
| D345,488 S | 3/1994 | Barnard et al. |
| 5,305,923 A | 4/1994 | Kirschner et al. |
| 5,306,083 A | 4/1994 | Caldwell et al. |
| 5,323,691 A | 6/1994 | Reese et al. |
| 5,341,957 A | 8/1994 | Sizemore |
| D364,175 S | 11/1995 | Alpers et al. |
| 5,464,120 A | 11/1995 | Alpers et al. |
| 5,553,749 A | 9/1996 | Oyler et al. |
| 5,766,665 A  * | 6/1998 | Miller ........................ 426/565 |
| 5,948,461 A  * | 9/1999 | Miller ........................ 426/565 |
| 6,068,875 A  * | 5/2000 | Miller et al. ................. 426/565 |

* cited by examiner

Primary Examiner—Arthur L. Corbin (57) ABSTRACT

Preparing a flavored confection includes using a disposable container of a neutral-flavored mix, which is transferred to a tempering freezer. The container is removed from the tempering freezer, and a selected syrup is pumped from a carton into the container for blending while the mix remains chilled. The syrup provides the selected flavor to the mix for serving within the disposable serving container. In another method, a flavored shake drink is prepared from the mix by dispensing flavored syrup through one of a plurality of dedicated nozzles, each in fluid communication with a corresponding solenoid control valve. A timer controls the valve open time to dispense a preselected amount of syrup. Switches are provided for doubling and halving the quantity of syrup for creating varying single-flavored and combination-flavored shakes. In addition to shielding around the blender spindle, a protective sleeve is placed within the cup for limiting splash during blending.

1 Claim, 9 Drawing Sheets

SLURRIED CONFECTION PREPARATION AND FLAVOR-INJECTED BLENDING SYSTEM AND METHOD

CROSS-REFERENCE TO RELATED APPLICATIONS

This application is a continuation of application Ser. No. 09/532,482, "Method for Preparing and Slurried Confection," filed on Mar. 22, 2000, now abandoned, which is a continuation of application Ser. No. 09/370,516, filed Aug. 6, 1999, issued as U.S. Pat. No. 6,068,875, which is a continuation-in-part of application Ser. No. 09/097,111 filed on Jun. 12, 1998, for "Method and Apparatus for Preparing a Flavored Shake," issued as U.S. Pat. No. 5,948,461, which itself was a continuation of application Ser. No. 08/451,256 filed on May 26, 1995, for "Multi-Flavored Comestible Shake Mixing Method," now U.S. Pat. No. 5,766,665; this application is also a continuation of application Ser. No. 09/650,980, "Flavor-Injected Blending Apparatus," filed Aug. 29, 2000, now abandoned, which was a continuation of application Ser. No. 09/114,611, "Multi-Flavored Food Preparation System and Method," filed Jul. 13, 1998, issued as U.S. Pat. No. 6,126,983, which is a continuation of application Ser. No. 08/904,075, "Flavor-Injected Blending Apparatus," filed Jul. 31, 1997, issued as U.S. Pat. No. 5,778,761, which is a continuation of application Ser. No. 08/695,238, "Flavor-Injected Blending Apparatus," filed Aug. 8, 1996, issued as U.S. Pat. No. 5,653,157, all commonly owned with the present invention.

FIELD OF THE INVENTION

The present invention relates generally to the dispensing and mixing of multiflavored foods such as milkshakes, frozen custards, slushes, and the like, more particularly to an efficient and cost-effective method of preparing a flavored shake, and also to the utilization of a flavor-injected blender for mixing and dispensing such foods without the need for large storage facilities and costly equipment.

BACKGROUND OF THE INVENTION

Beverage dispensing systems are used to provide consumers with beverages that are typically a mixture of previously stored concentrate and water. Further, milk shake machines are available for use in fast-food styled restaurants, but such machines are typically expensive. In addition, storage of product used is typically within the machine thus demanding expensive retail space for placement and convenient use.

By way of example, U.S. Pat. No. 5,056,686 to Jarrett discloses a beverage dispensing system for providing different flavored drinks mixed from concentrate and water. The system has a number of containers for storing different flavors of concentrate for pumping to a hand-held, "bar-gun" styled, dispensing nozzle via a piping system including a coupling adapted to received pressurized water. Each container is in fluid communication with a specific fluid-driven proportion pump that is also in fluid communication with the pumping system. Separate and fluid supply lines extend from each pump to a dispensing head. Valves in the dispensing head control the discharge of fluid therefrom so that when a selected beverage is desired, the appropriate concentrate and water are discharged simultaneously to ensure that the end beverage contains the appropriate mixture of concentrate and fluid.

User-operated vending machines, such as that described in U.S. Pat. No. 5,341,957 to Sizemore, discloses a cup-type vending system that includes a currency output device and automatically outputs a beverage into a cup in response to a payment and selection of a beverage. The vending machine includes a plurality of disposable containers of beverage syrup, such as "bag-in-box" packages, stored in an auxiliary cabinet. A dispensing system functions to draw syrup from the disposable containers and selectively dispense a predefined or selected amount of syrup into an awaiting cup. The system includes pumping stages wherein one stage draws a selected amount of syrup from a package through a feed conduit and discharges the selected amount through a nozzle into the cup.

U.S. Pat. No. 3,934,759 to Giannella et al. discloses a milk shake machine having a multiple mixing, blending and dispensing head for mixing and dispensing a variety of flavored milk shakes from one reservoir of unflavored comestible. Each head incorporates a premix chamber, wherein an unflavored, neutral comestible is injected under pressure, and is mixed under turbulence with a selected flavoring syrup which is also injected under pressure. A flexible shaft beater mixes the partially mixed comestible with the flavoring syrup and a triple port dispensing nozzle directs the mixed flavored milk shake into a container for serving.

By way of further example, U.S. Pat. No. 3,295,997 to Tomlinson et al. discloses a milk shake machine which include a mixer for reducing pre-frozen flavored ingredients stored within a container to a flavored milk shake with the addition of a preselected amount of milk supplied from a milk storage tank carried by the machine.

U.S. Pat. No. 5,323,691 to Reese et al. discloses a frozen drink mixer for preparing blended beverages, particularly frozen drinks, in which an ice dispenser, liquid mix dispenser, and blender are combined into a single unit. The apparatus automatically delivers an appropriate amount of ice and liquid to the blender unit and turns on the blender at an appropriate time to prepare the frozen drink of desired size. A drink mixing and dispensing machine described in U.S. Pat. No. 2,855,007 stores a mix within a tank carried by the machine and pumps the mix through a freezing chamber prior to dispensing into a cup which is held under a mixing blade. Syrup pumps are also carried within the cabinet of the machine for dispensing one or two syrups into the cup before repositioning the cup under the mixer for dispensing and mixing the syrup with the milk shape styled mix.

While a variety of milk-shake-styled syrup dispensing and mixing devices and methods are known in the art, there remains a need for an economical method for efficiently and cost effectively providing a customer with a plurality of options for a milk shake flavored as desired by the customer.

There also remains a need to provide an inexpensive system to provide a flavored shake to a customer while maintaining low capital cost as well as low operating cost and do such while maintaining the cleanliness and health standards demanded in the industry.

SUMMARY OF INVENTION

In view of the foregoing background, it is an object of the present invention to provide an efficient method of preparing a flavored confection such as a nondairy milk shake within health-conscious standards. As is well known, strict sanitation codes and enforcement of these codes creates a need for improved and simplified food dispensing methods. It is further an object of the present invention to provide a variety of flavors while minimizing storage and expanding accessibility for such flavors. It is another object to use such flavors with a neutral flavored mix for use as a base to which selected flavors are dispensed. It is yet another object of the invention to minimize inventory needs typical in an ice cream counter styled restaurant and improve on the speed of service for such a restaurant. It is yet another object of the present invention to provide such a method at a cost well below that associated with current methods that include typically expensive storage and processing equipment.

In another aspect of the present invention, it is an object to provide a system for providing a variety of flavors for a flavored food while minimizing storage and expanding accessibility for such flavors. It is further an object to use such flavors with a neutral-flavored, prepackaged shake mix for use as a base to which selected flavors are dispensed. It is yet another object of the invention to minimize inventory needs typical in the ice cream counter styled restaurant and improve on the speed of service for such a restaurant.

These and other objects, advantages, and features of the present invention are provided by a method for preparing a flavored slurried confection that comprises providing a disposable serving container and depositing a neutral flavored mix into the container for storage prior to the preparation of the confection. It is desirable that the neutral-flavored mix have a freezing-point temperature lower than normally found for that of water. It is further desired that the mix-filled container is stored within a storage freezer for maintaining the neutral-flavored mix at a storage temperature, and transferred to a tempering freezer generally close to a preparation and serving area for maintaining the neutral-flavored mix at a blending temperature. The mix-filled container is removed from the tempering freezer for preparation of a flavored confection. In order to provide a variety of flavors for selection by a customer, a plurality of flavored syrups is provided. In the preparation of the confection, the mix-filled container is manually positioning for pumping a selected syrup into the container. The syrup is selected from the plurality of flavored syrups, and a small quantity is pumped into the mix-filled container for blending the selected syrup with the neutral-flavored mix. During the blending, the mix preferably remains chilled, whereby the small quantity of syrup adds a selected flavor to the body and mass of the neutral-flavored mix for forming the flavored slurried confection within the disposable serving container. The flavored slurried confection is then served within the disposable serving container for consumption in that same disposable serving container.

In a preferred embodiment, the plurality of flavored syrups are stored in bag-in-a-box-styled packages. In an alternate preparation and serving method, an open-ended tubular sleeve is attached to the mix-filled container prior to pumping the syrup. The open-ended tubular sleeve extends walls of the container for limiting splashing of the mix during blending, and may comprise inserting the sleeve into the container, or attaching the sleeve about a lip of the container, as desired. The sleeve may remain or be removed prior to serving the prepared confection.

it is therefore an object of the present invention to provide a system for efficiently and effectively preparing a flavored food such as a comestible drink, such as a milk-shake styled drink within health conscience standards. As is well known, strict sanitation codes and enforcement of these codes create a need for improved and simplified food dispensing systems and methods. It is further an object to provide a variety of flavors while minimizing storage and expanding accessibility for such flavors. It is further an object to use such flavors with a neutral flavored, pre-packaged shake mix for use as a base to which selected flavors are dispensed. It is yet another object of the invention to minimize inventory needs typical in the ice cream counter styled restaurant and improve on the speed of service for such a restaurant.

Additional objects, features, and advantages are provided by another aspect of the invention, a system for preparing a comestible flavored food comprising a housing, connection means carried by the housing for fluid communication with a food flavoring reservoir, a nozzle carried by the housing, the nozzle in fluid communication with the connection means for dispensing a selected food flavoring into a cup positioned external to the housing, a valve communicating with the connection means for controlling the food flavoring flow to the nozzle, the valve further having means for selectively delivering a predefined amount of food flavoring to the nozzle in response to selection of a food flavoring by a user, and a blender carried by the housing, the blender having a spindle head external the housing for positioning into a cup for blending a food flavoring dispensed into the cup with a mix stored in the cup. Further, a reservoir is provided for storing a plurality of different food flavorings therein, along with a conduit communicating between the reservoir and the connection means, and pump means in fluid communication with the conduit for drawing food flavoring from the reservoir and supplying the food flavoring to the connection means. A selected flavored food mix is thus prepared and served within a cup originally used for storing the mix.

BRIEF DESCRIPTION OF DRAWINGS

A preferred embodiment of the invention as well as alternate embodiments are described by way of example with reference to the accompanying drawings in which.

DETAILED DESCRIPTION OF PREFERRED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
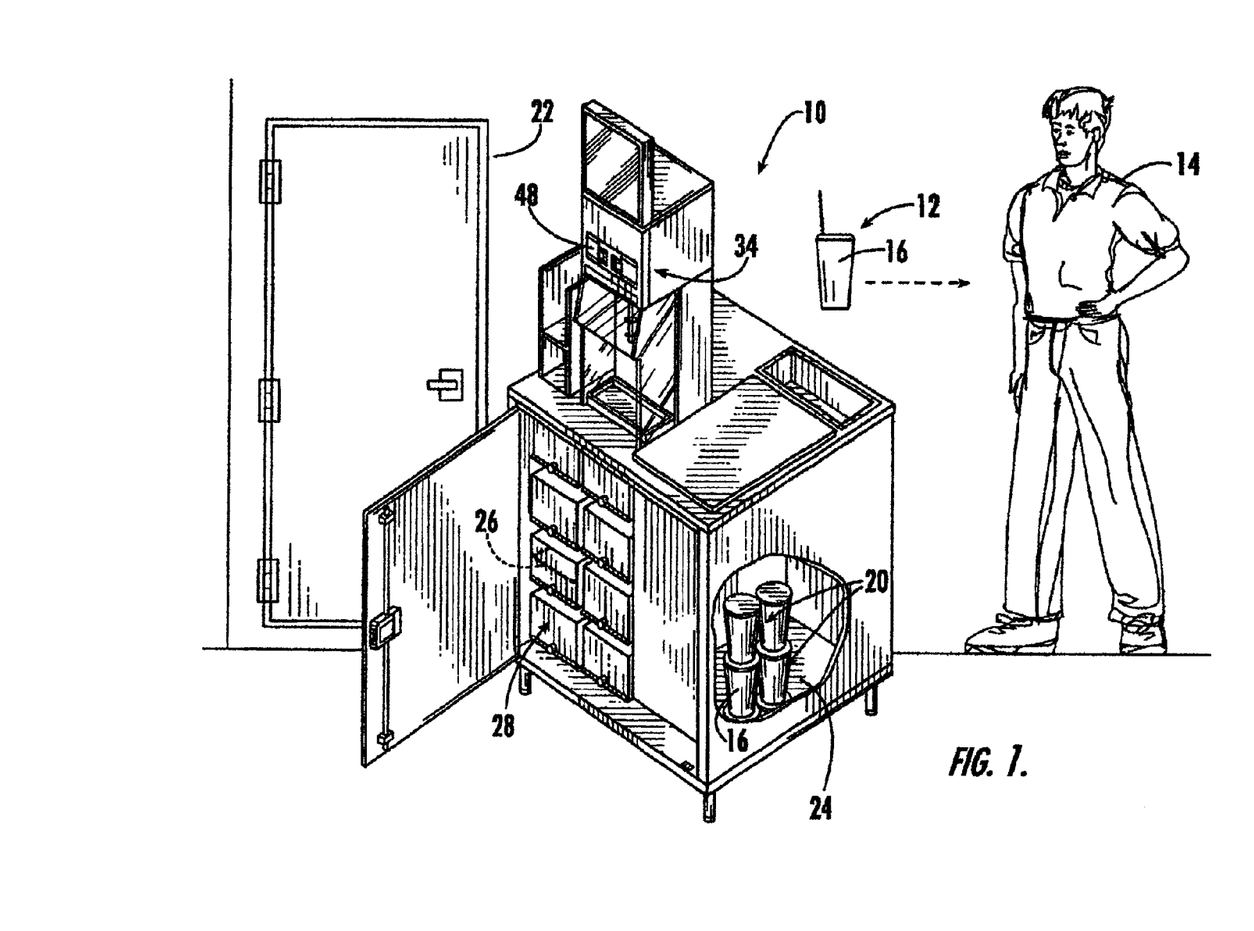
FIG. 1 is a perspective view of a slurried confection system of the present invention.
Figures 2, 3:
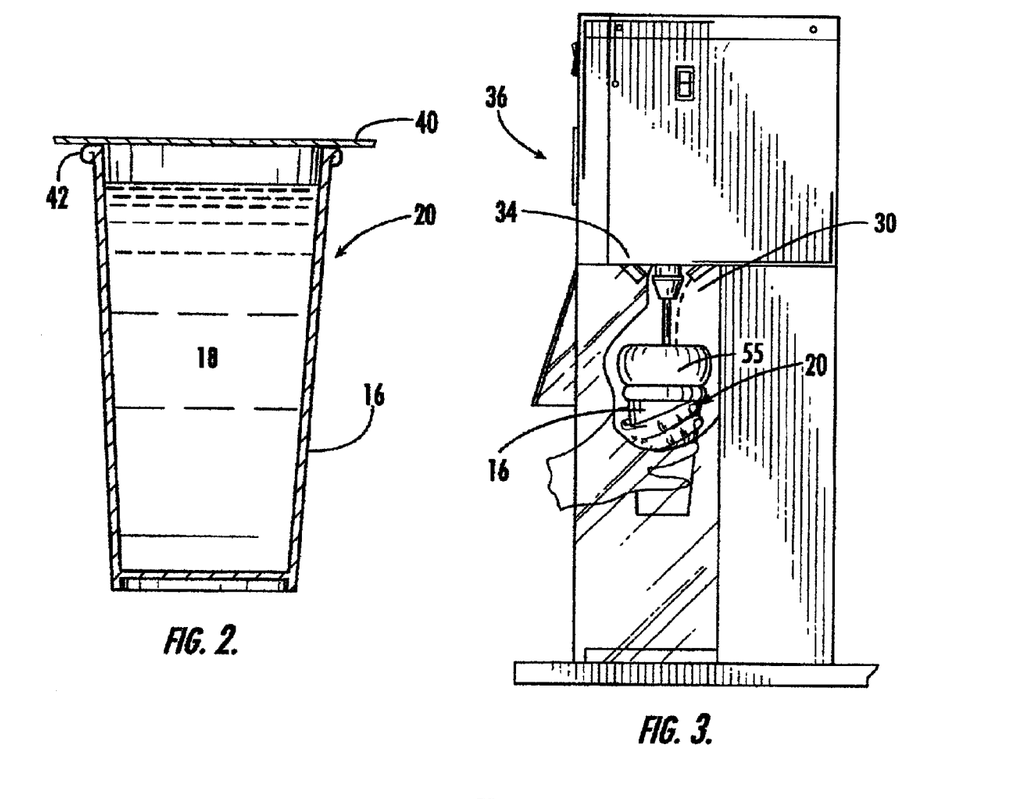
FIG. 2 is a partial cross-sectional view of a mix-filled container.
FIG. 3 is a side elevation view of a flavor injected blending apparatus.

One preferred method of the present invention comprises a system 10 and process for preparing a flavored slurried confection 12, such as a shake, for serving to a customer 14 in a disposable serving container 16, such as a cup, wherein the serving container is effectively and efficiently used throughout the preparation process, as illustrated by way of example, with reference to FIG. 1. Preferably, the disposable serving container 16 is sufficiently sized for holding an individual serving of the slurried confection 16 therein. The present invention includes depositing a neutral flavored mix 18 into the disposable serving container 16, herein referred to as a mix filled container 20, as illustrated with reference to FIG. 2, wherein the neutral flavored mix preferably has a freezing point temperature lower than normally found for that of water. A reasonable supply of mix filled disposable serving containers will generally be stored in an on-premises storage freezer 22, such as a walk-in styled freezer as illustrated with reference again to FIG. 1, for maintaining the neutral flavored mix at a desirable storage temperature with a supply typically sufficient for accommodating sales of the confection between shipments of the mix filled containers from a supplier. Preferably, and as illustrated with reference again to FIG. 1, a quantity of the mix filled containers 20 are transferred from the storage freezer 22 to a tempering freezer 24 for maintaining the neutral flavored mix at a blending temperature. The mix filled containers 20 are then removed from the tempering freezer 24 for preparation of the flavored confection 12.

It has been shown that a blending temperature below the freezing temperature of water and generally about −15° C. Further, it is desirable to have the neutral mix be such that it contains and have air suspended therein for providing a desired texture to the mix and better manipulating of the mix during blending with syrups and syrup styled flavorings. With such, a desirable non-dairy sorbet, frappe, shake, and the like are produced and enhanced by the variety of flavor selection made available to the customer at a attractive price. It is expected that syrups will include various puree, sugared and solid particles such as chopped fruits and the like.

Figure 4:
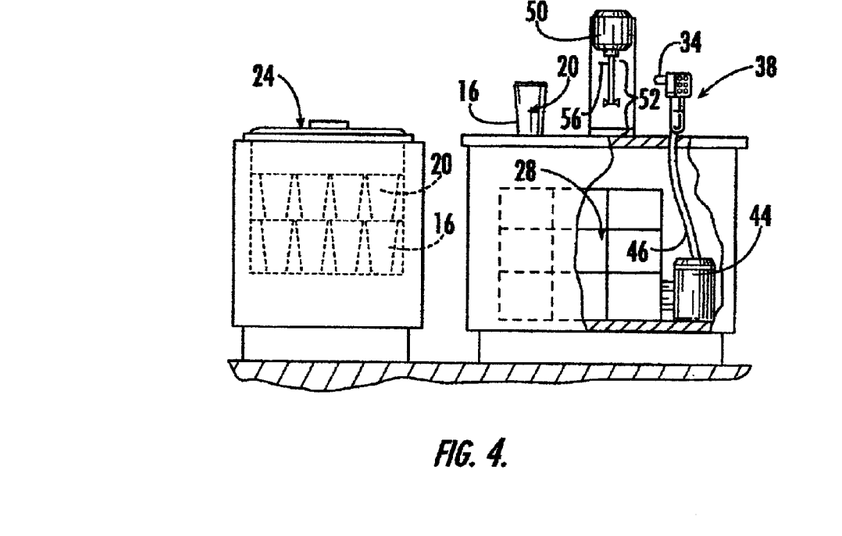
FIGS. 4 and 5 are diagrammatical styled cutaway elevation and top views of an alternate system of the present invention.
Figure 5:
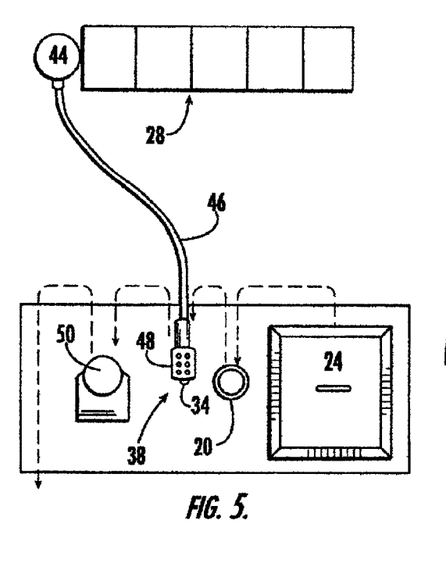

As illustrated with reference to FIG. 3, and again to FIG. 1, a plurality of flavored syrups 26 are stored in bag-in-the box styled packages 28 for pumping a selected syrup 30 and dispensing the selected syrup into the mix filled container 20. Whether using a dispenser 34 from a flavor injected blending apparatus 36, illustrated by way of example with reference again to FIGS. 1 and 3, or a bar-gun apparatus 38, as illustrated with reference to FIGS. 4 and 5, the mix filled container 20 is held and a desired flavored syrup manually selected from the plurality of flavored syrups 26 available for pumping from the packages 28. Preferably, a small quantity of the selected syrup 30 is pumped into the mix filled container 20 for blending the selected syrup with the neutral flavored mix 18 while the mix remains chilled, whereby the small quantity of syrup adds a selected flavor to the body and mass of the neutral flavored mix for forming the flavored slurried confection 12 within the disposable serving container 18. As earlier described with reference to FIG. 1, the flavored slurried confection 12 is then served for consumption within the disposable serving container 16.

As illustrated with reference again to FIGS. 1 and 2, a lid 40 is attached to the mix filled container 20 for sealing the neutral flavored mix therein during storage. With such an arrangement, handling the mix filled container 20 is done within strict health code standards and with little fear of contaminating the pre-packaged neutral flavored mix 18. It is anticipated, as is illustrated with reference again to FIG. 2, that a flexible foil styled lid will be sealed along the container mouth or lip 42. The lid 40, in such an embodiment, extends beyond the lip 42 for ease in handling, pealing from the mix filled container 20, and disposal in a manner meeting desirable cleanliness and efficiency consistent with objects of the present invention.

As described earlier with reference to FIGS. 1 and 4, bag-in-box styled packages 28 are preferably used to store the various flavored syrups 26. The syrups 26 are individually pumped through dedicated pumps 44 and conduit 46 to the dispenser 34 for selecting a desired syrup and dispensing the selected syrup 30 into the mix filled container 20 for blending the selected syrup or multiple selected syrups with the neutral flavored mix 18. As is typical on bar gun apparatus 38, and flavor injected blending apparatus 36, syrup flavor selector buttons 48 provide for the selection of a desired syrup to be dispensed after delivery from an appropriate package 24 having the selected syrup 26. The contents, a variety of flavored syrups 26, of each package 24 is in fluid communication with the dispenser 34, a bar gun styled dispenser typically used to select and dispense liquor drinks and mixed soda drinks in combination with a preset amount of injected water. Once a particular flavored syrup 26 has been identified, an appropriate button 48 on the dispenser 34 is pushed which causes the pump 44 dedicated to that syrup 26 to pump the selected syrup 30 from its individual package 28 through conduit 46 in fluid communication with its individual pump. Typically one push of the selector button 48 insects a preset amount of syrup, two button pushes injects a doubled amount. In this way, customized, multi-flavored shake ingredients are readied for blending into the confection of choice. Further, a combination of flavors can be injected into the mix filled container 20 depending on the needs of customer.

As described in the above referenced related applications, the disclosure of which is herein incorporated by reference, it is well known in the soda fountain art to use a mixer 50 that includes a mixing cup, typically made of metal for preparing a milk shake or similar confection. Once prepared within the mixing cup, the flavored shake is then poured into a serving cup. More often than not, more mixed shake is prepared than needed to accommodate the amount of shake ordered. Further, the typical mixer 50 has a preset height dimension 52, so that a switch 56 can be activated for the blending process, while the mixing cup is held between the switch and a hook upon which a bottom portion of the cup is placed, as described in U.S. Pat. No. 5,766,665. To accommodate use with the blender 50, having the preset height dimension 52, a containers 17 having an appropriate height can be used, as illustrated with reference to FIG. 6. In the alternative, an open ended tubular sleeve 54 is inserted into the container 16 at various depths 58, as illustrated with reference to FIG. 6.

Figure 7:
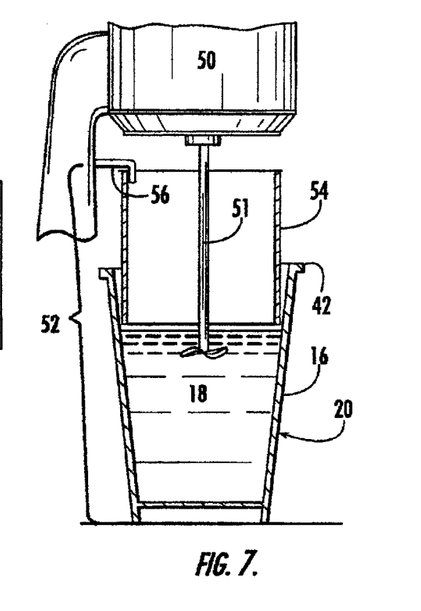
FIG. 7 is a partial cross-sectional view of a cylindrical sleeve in combination with a cup having a tapered side wall.

One embodiment of the present invention includes attaching the open ended tubular sleeve 54 to the mix filled container 20 prior to dispensing syrup for extending walls of the container sufficiently above the lip 42 for limiting splashing of the mix out of the container during blending, as illustrated with reference to FIG. 7. The embodiment of the sleeve 54, described in the related references, include attaching the sleeve 54 by inserting the sleeve into the container 16. The sleeve 54 enters at least partially into the container 20 and is held in place by container inside walls. The sleeve 54 is dimensioned for passing into the mix filled container 20, and depending on the container opening and taper within the container walls, the sleeve 54 will rest against an inner surface of the container.

Figure 6:
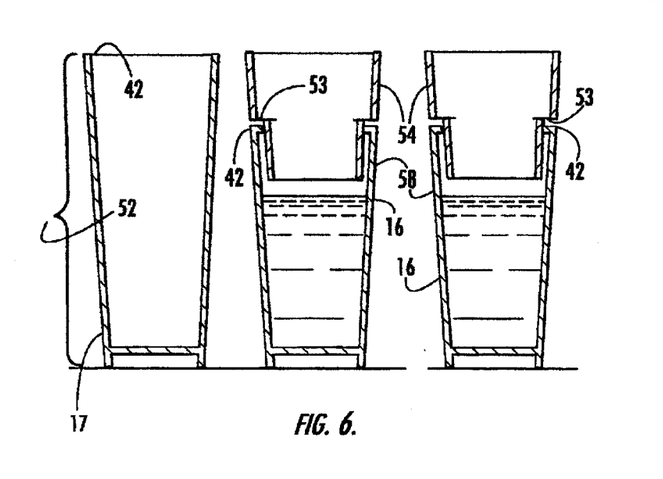
FIG. 6 is a partial elevation view illustrating a sleeve inserting step of the present invention.

As illustrated with reference agin to FIG. 6, the sleeve 54 may have a tapered side wall allowing effective use with parallel walled containers. Further, the sleeve 54 may include a step for receiving the container lip 42. Alternatively, for containers having smaller openings, the tapered wall of the sleeve 54 will contact the lip 42 and be held in place for the blending step. The sleeve 54 extends sufficiently above the container lip 42 to prevent splashing out of the container and onto the surrounding counter where the confection is being prepared. The sleeve 54 may also include a step 53 that provides a height dimension such that the combination of sleeve and container can be used in a standard manner with the well known mixer 50.

Figure 8:
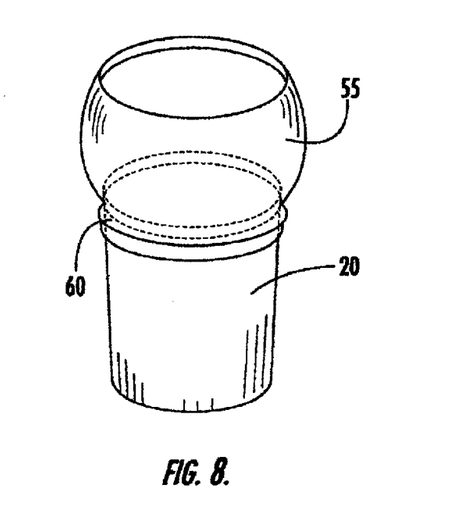
FIGS. 8 and 9 are perspective and cross-section views of a bulbous shaped sleeve of the present invention attached to a container.
Figure 9:
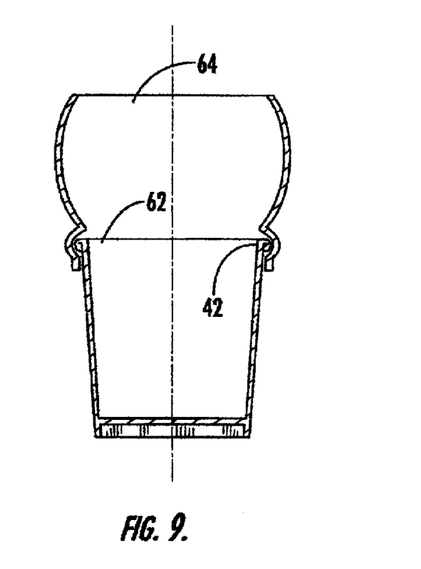
Figure 10:
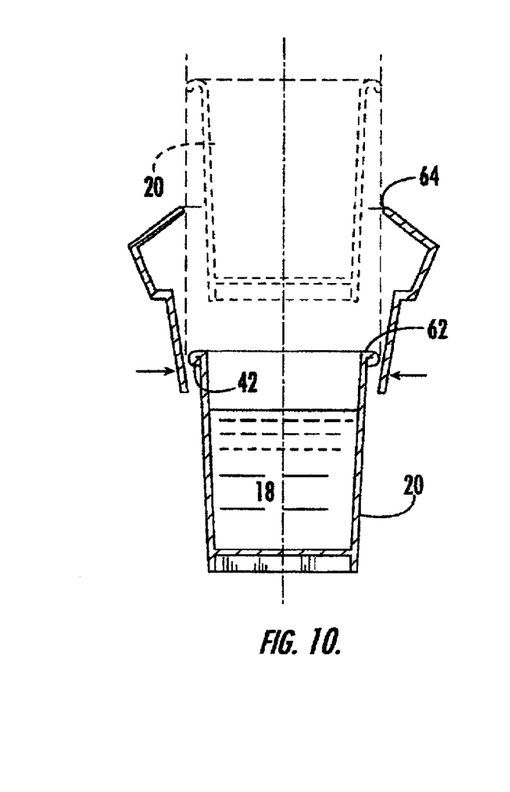
FIG. 10 is a cross-sectional view of an alternate bulbous-shaped sleeve illustrating attaching onto a container.

In an alternate embodiment, a bulbous shaped sleeve 55, illustrated with reference to FIGS. 8 and 9, includes a flanged portion 60 which receives the lip 42 in a locking arrangement, and thus attaching the sleeve 55 comprises attaching the sleeve about the lip, wherein the lip defines an opening 62 of the container. In addition, the sleeve 55 comprises includes a top most opening 64 sufficient for passing the container 20 therethrough, as illustrated with reference to FIG. 10. As illustrated with reference agin to FIGS. 9 and 10, various shaped contours may form the sleeve 55, without departing from the feature allowing the container 20 to be passed through the opening 64 and have the lip 42 snap into locking position within the flanged portion 60.

With the sleeve 54, blending is completed as illustrated with reference again to FIG. 7, having an appropriately sized container 16 and sleeve 34 combination inserted into the mixer 50 for blending of the ingredients using the motor driven mixing blade 51. It is anticipated that containers having 20, 16 and 12 ounce capacities will be used to serve flavored shakes. Once the blending is completed, the sleeve 54 will preferably be removed for serving the shake. A disposable sleeve may be used, or a sleeve used that can be washed for reuse.

Figure 11:
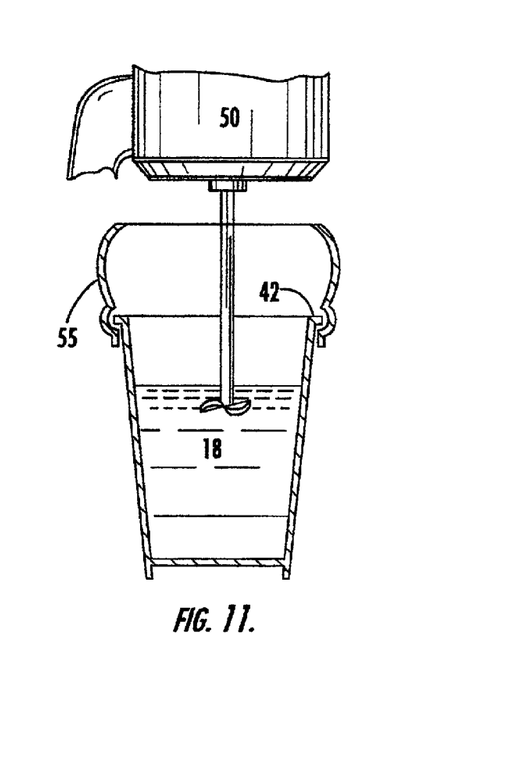
FIG. 11 is a partial cross-sectional view of the sleeved container held for blending a syrup with a mix.

The present invention is effectively used for a variety of confections. It is expected that the bulbous shaped sleeve 55, as described with reference to FIGS. 3 and 11, will be used for such varieties as a whipped cream topped dessert, in which case the sleeve 55 will likely remain attached to the container when the confection 12 is served. Generally, the sleeve 55 will be attached as described with reference again to FIG. 10, and hand held during the blending of the syrup with the mix. Such an arrangement allows for ease and convenience in handling of the mix filled containers 20 and sleeve 55 in an effective and timely manner.

Figure 12:
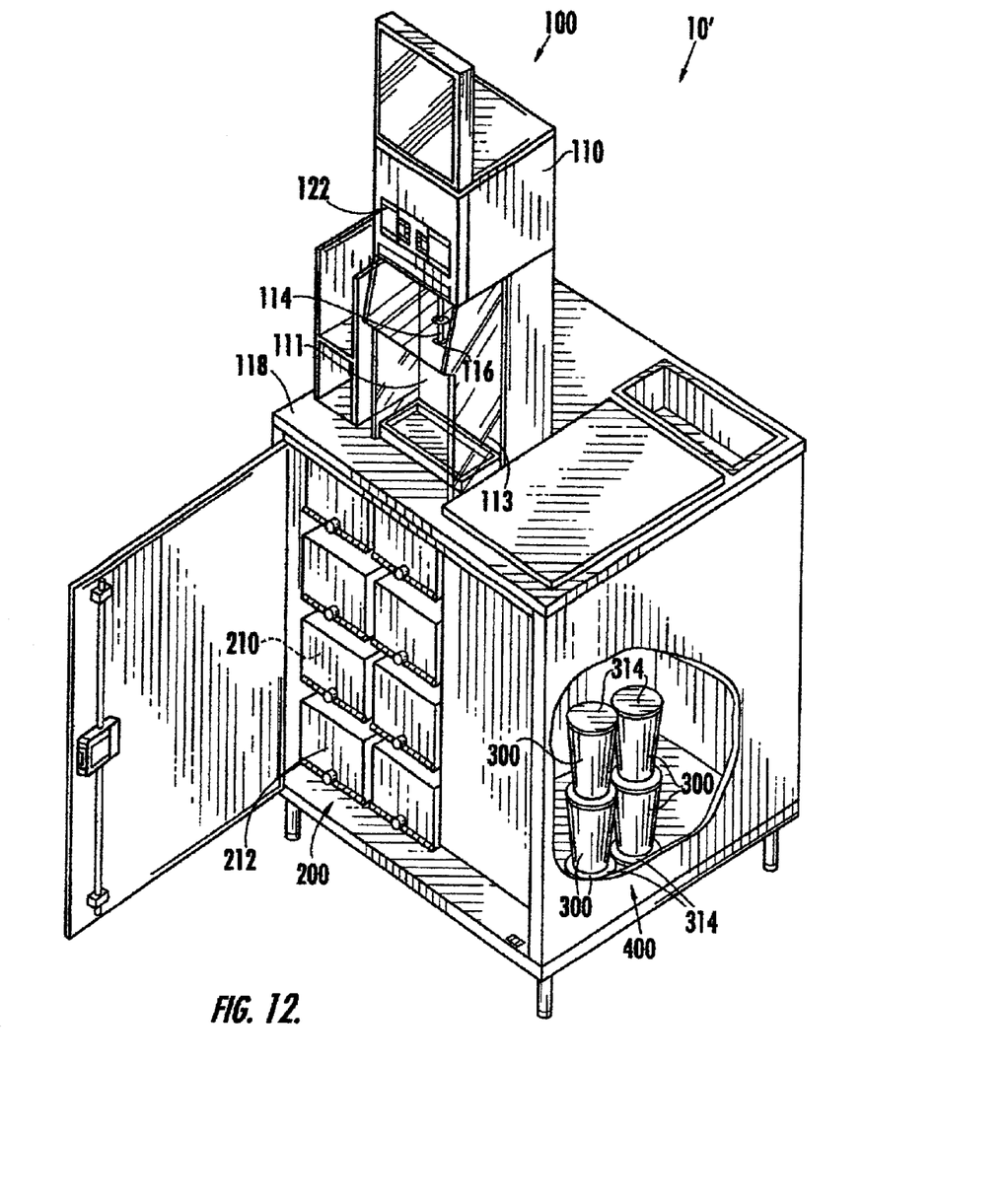
FIG. 12 is a perspective view of one preferred embodiment of the present invention illustrating a system for preparing a comestible flavored shake.

A discussion of another aspect of the present invention will now be undertaken. Referring initially to FIG. 12, a system 10' for preparing a flavored food such as a dessert, fruit drink, or shake comprises a flavor-injected blending apparatus 100 for injecting a selected food flavoring or syrup stored in a bag-in-a-box styled syrup reservoir 200 into a container or cup 300 that is removed from its tempering freezer 400 for blending the selected syrup with a neutral flavored shake mix, by way of example, that has been stored within the cup 300.

Figures 13, 16:
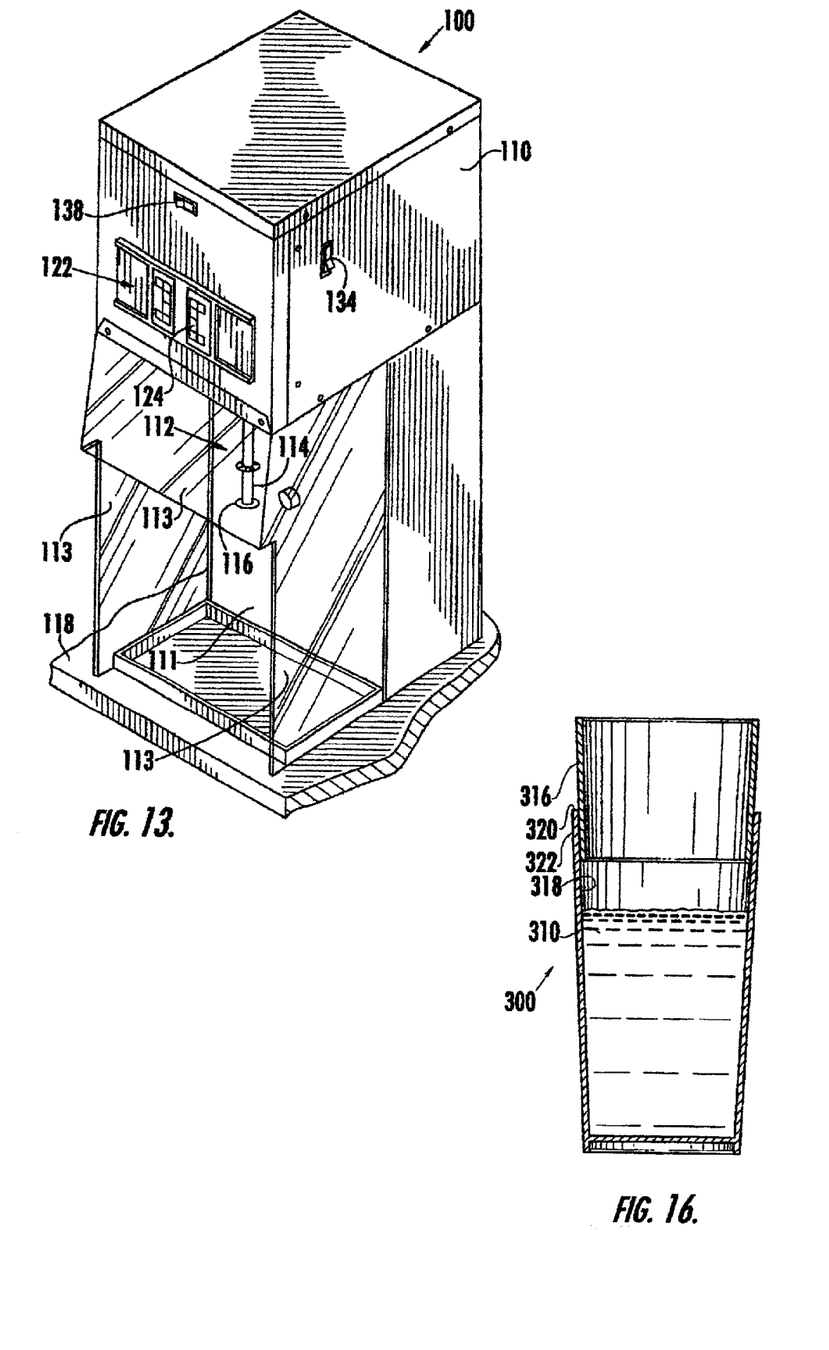
FIG. 13 is a perspective view of a syrup dispensing and blending apparatus of the present invention.
FIG. 16 is a cross-sectional view of a cup and sleeve inserted within the cup.
Figure 14:
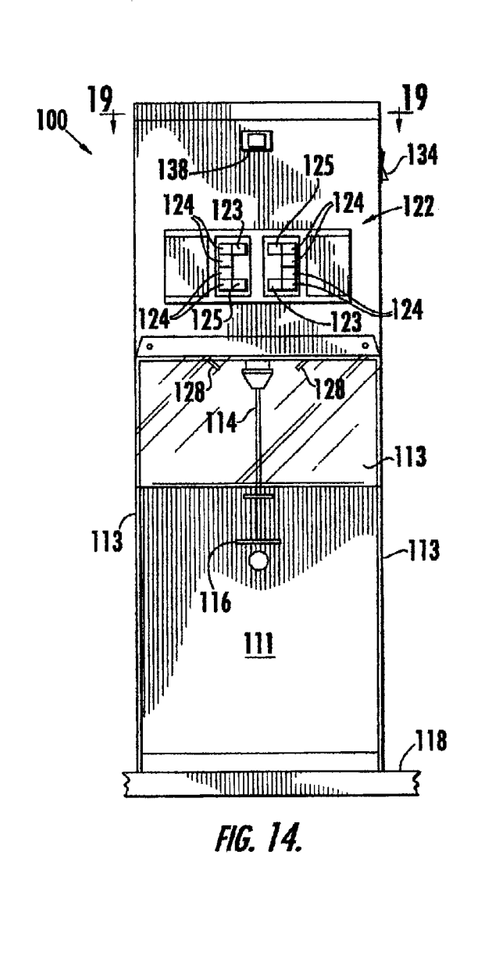
FIG. 14 is a front elevational view of the apparatus of FIG. 13.

As illustrated with reference to FIGS. 13 and 14, the flavor-injected blending apparatus 100 includes a housing 110. Blender means 112 includes a spindle 114 that extends external to the housing 112, and vertically downward, for having the cup 300 receive the spindle 114 during the blending of a selected food flavoring or flavored syrup 210 with a food base such as a neutral flavored shake mix 310 with the cup 300 as the cup 300 is manually held 312 for communication with mixing blades 116 of the spindle 114 for blending the selected syrup 210 with the shake mix 310, as illustrated with reference to FIG. 15. As further illustrated with reference to FIGS. 13–15, a housing wall portion 111 and transparent shield side and front panels 113 confine splattering of the mix 310 during the blending operation.

A flavored shake is prepared using the neutral-flavored shake mix 310, which is prepackaged in the cups 300 and shipped to point-of-sale locations where the cups 300 are first stored in food freezers and selected quantities removed from the freezer storage and placed in the tempering freezer 400, as illustrated again with reference to FIG. 12, which tempering freezer 400 is conveniently positioned proximate the apparatus 100. By way of example, a food freezer may be set at approximately zero to minus ten degrees Fahrenheit for long-term storage of the neutral mix 310 within the respective cups 300. The tempering freezer 400, in a preferred operation of the system 10', is set to maintain the stored neutral mix 310 within the cups 300, at a temperature between eighteen and twenty two degrees Fahrenheit. Such preferred staging of the neutral mix 310 within the tempering freezer 400 has been found to provide a consistent-tasting shake desirable to the customer. The quantity of mix 310 or cups 300 stored in the tempering freezer 400 will be determined by the sales performance at any given store. The cup 300 is sealed with a lid 314 prior to and during storage. With such an arrangement, handling the mix 14 at the restaurant is done within strict health code standards and with little fear of contaminating the prepackaged neutral mix 310. It is anticipated that a flexible foil styled lid 314 will be used for ease in handling for pealing of the lid 314 from the cup 300.

As illustrated again with reference to FIGS. 15 and 16, a sleeve 316 having open ends is inserted into the cup 300. The sleeve 316 enters at least partially into the cup 300 and is held in place by the cup inside wall 318. The sleeve 316 extends sufficiently above the cup rim 320 to prevent the mix 310 from splashing and hitting the cup outside wall surface 322 and surrounding counter 118 where the shake is being prepared. With such a sleeve 316 and use of the apparatus 100, the cup 300 used to store the neutral-flavored mix 310 is also used to serve the resulting flavored shake to the customer.

It is well known in the soda fountain art to use a mixer that includes a mixing cup typically made of metal for preparing a shake. Once prepared, the flavored shake in then poured into a serving cup. Often, excess mixed shake is prepared only to be wasted because the size shake ordered does not accommodate the amount of shake prepared. Such problems are eliminated by the present invention.

Figure 17:
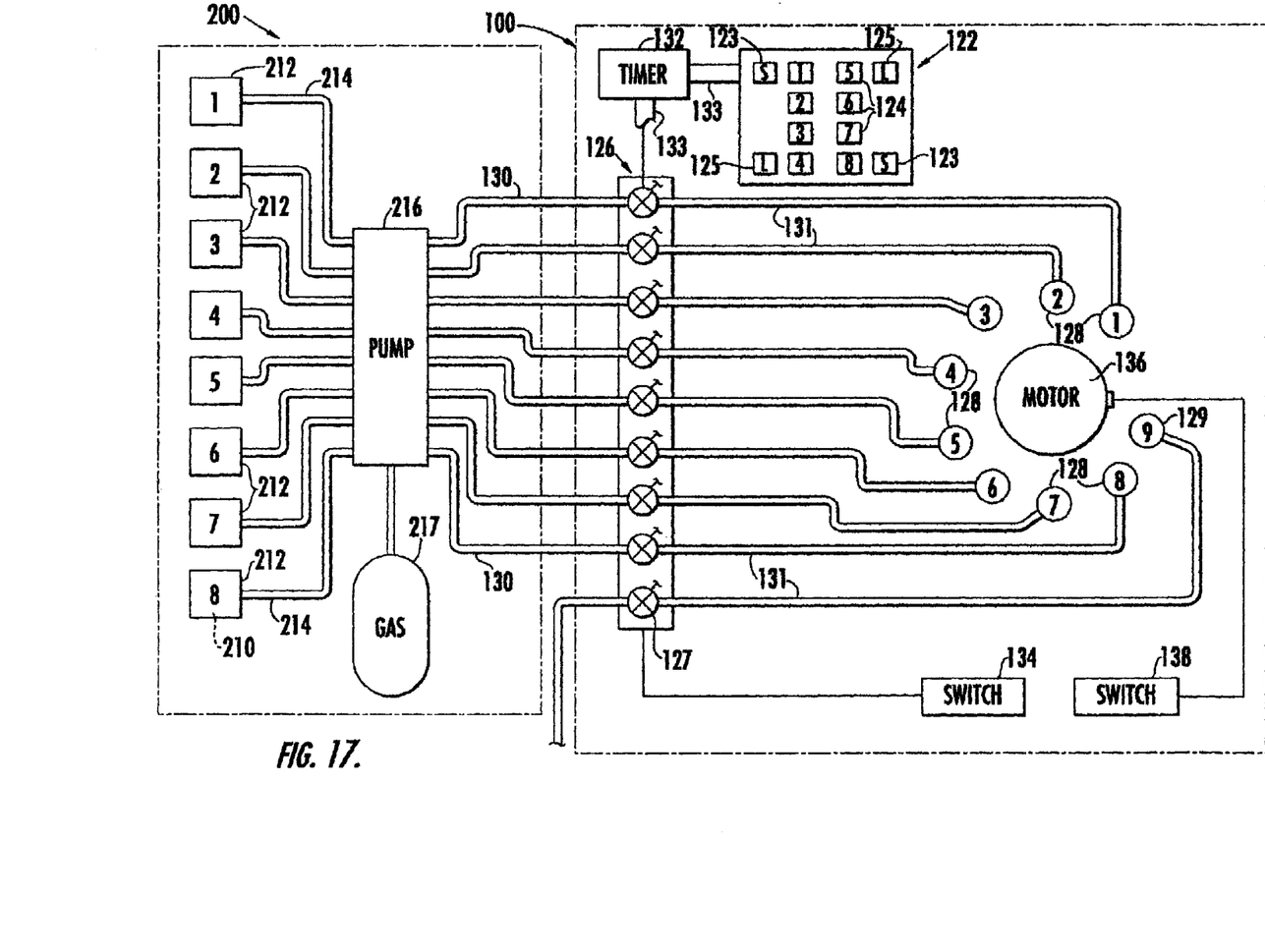
FIG. 17 is a schematic drawing illustrating operational elements of a preferred embodiment of the present invention.
Figure 18:
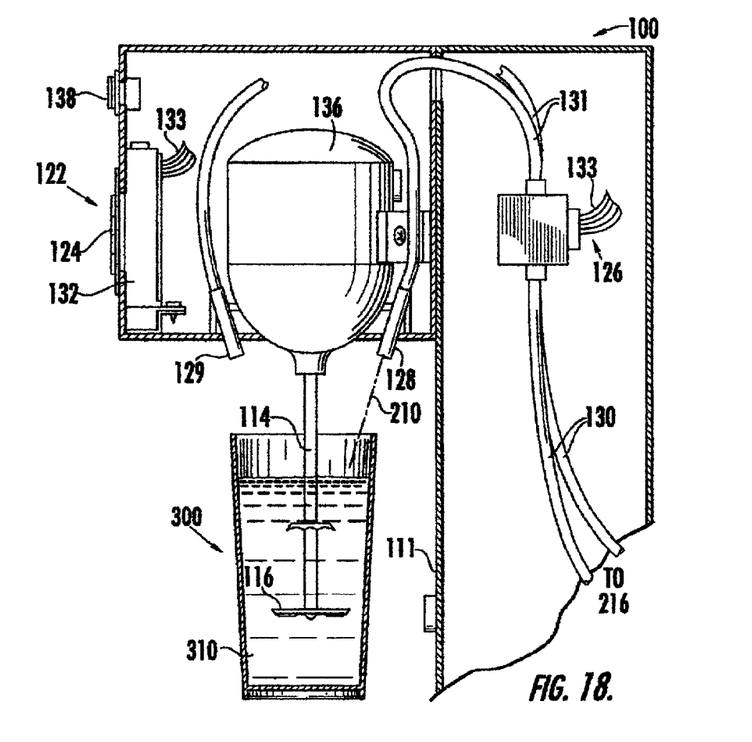
FIG. 18 is a partial side cross-sectional view of the apparatus of FIG. 13 identified as cross-section 18—18 in FIG. 19.
Figure 19:
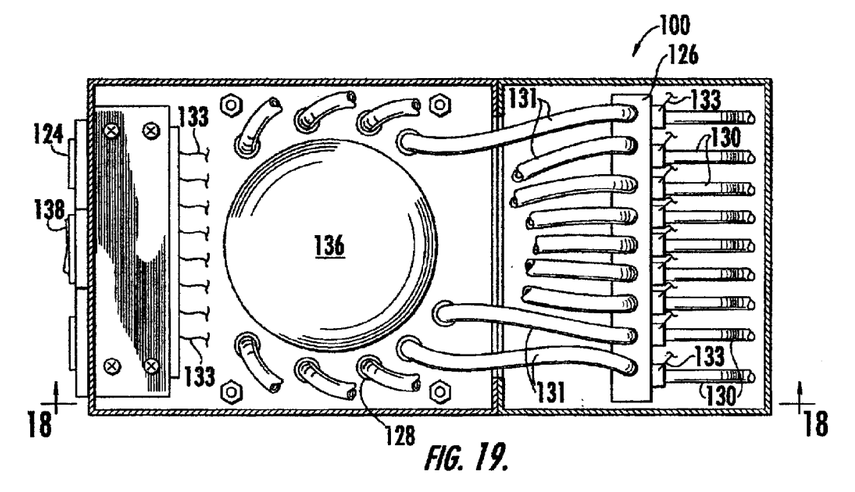
FIG. 19 is a top cross-sectional view of the apparatus of FIG. 13 identified as cross-section 19—19 in FIG. 14.

As illustrated again with reference to FIGS. 12–14, the apparatus 100 further comprises control means 120 including a syrup selector switch 122. The switch 122 includes a set of buttons 124 for the selection of different flavored syrups 210 stored within the reservoir 200. As illustrated with reference to FIG. 17, the apparatus 100 communicates with the reservoir 200. By way of example in a preferred embodiment of the present invention, eight disposable reservoir bags 212 are in fluid communication with eight corresponding solenoid valves 126 that control the flow of syrup 210 from the bag 212 to a corresponding nozzle 128. The eight valves 126 and eight nozzles 128 are carried by the housing 110, as illustrated with reference to FIGS. 18 and 19. Conduit 214 is provided from each bag 212 to a pump 216. Second conduit 130 is provided from each solenoid valve 126 to the pump 216, and third conduit 131 from the valve 126 to the nozzles 128. Each bag 212 has its corresponding conduit 214, 130, 131, and nozzle 128. The pump 216 operates to continuously supply the syrup 210 from each bag 212 to each respective valve 126, thus providing pump means in fluid communication with the conduit 214, 130 for drawing the syrup 210 from the reservoir 200 and continuously supplying the syrup 210 to the valve 126, which controls the flow of any selected syrup 210 to a corresponding nozzle 128.

The pump 216 in one preferred embodiment of the present invention provides an independent pump for each bag 212. The pump 216 in one preferred embodiment is a well-known beverage gas pump supplying the syrup 210 under pressure with the typically nonpressurized bag-in-the-box reservoir bags 212. The pump 216 can be driven by carbon dioxide, nitrogen, or compressed filtered air 217, and does not come in contact with the syrup 210. As is well known, separation of the syrup 210 and pumping gas eliminates contamination, foaming, and the need for purging of the conduit 130, 214 when the syrup bags 212 are empty. The pump 216 operates when the selected syrup 210 is needed, and in response to the valve 126 opening, thus permitting dispensing of syrup through the nozzle 128. The pump 216 pressurizes the syrup to match the pressure of the gas supplied to the pump 216. When the valve 126 is closed, the incoming gas and output syrup pressures equalize and the pump stops. As the bags 212 empty, the pump 216 draws a vacuum and collapses the bag 212, thus completely evacuating the syrup 210. The pump 216 will shut off once a preset vacuum point is achieved and held. When a new bag 212 is installed containing replacement syrup, the vacuum drops, and the pump 216 restarts and pressurizes the reservoir 200. A WICOR Company SHURflo® Beverage Gas Pump 166–200-XX is appropriate for use.

Again with reference to FIG. 17, a controller or programmable timer 132, also carried by the housing 110, is programmed for actuating the selected solenoid valve 126 through electrical connection means 133 and holding the valve 126 open for a preselected period of time. The timer 132 is activated by the selector switch 122, which in a preferred embodiment is operated as a momentary switch 122. By way of example, the preselected time period in a preferred embodiment operated the valve 126 for dispensing an once of syrup into the cup 300 having a sixteen-ounce capacity and approximately thirteen ounces of the neutral-flavored mix 310. In addition to the flavor select buttons 124, a short period button 123 and a long period button 125 are provided, as illustrated with reference to FIG. 17 and FIG. 13. The short button 123 signals the timer 132 programmed to reduce the time period that the valve 126 remains open for dispensing a half-ounce of the selected syrup 210. The long button 125 signals the timer 132, programmed to increase the time period that the valve 126 remains open for dispensing two ounces of the selected syrup 210.

Yet again with reference to FIG. 17, a water supply or sterilizing solution is dispensed through the valve 127 for delivery of the sterilizing solution or fresh water through a dedicated nozzle 129 for flushing and cleaning the spindle 114 after each use in preparing a flavored shake. A switch 134 carried by the housing 110 activates the valve 127 for permitting the sterilizing solution to be dispensed through the nozzle 129 for cleaning the spindle 114, as illustrated with reference to FIG. 18. As further illustrated with reference to FIGS. 17 and 18, a blender motor 136 carried by the housing 110 is activated by a motor switch 138 carried by the housing 110. As illustrated again with reference to FIG. 18, each nozzle 128, 129 is angled for dispensing the selected syrup 210 toward the spindle 114. In the case of the sterilizer nozzle 129, such an angle permits the spindle 114 and spindle blades 116 to be hit directly with water or sterilizing solution. In addition, once the sterilizing solution has been added to an empty container used to clean the spindle 114, the motor switch 138 is pressed and spindle and blades operated within the solution until clean.

Figure 15:
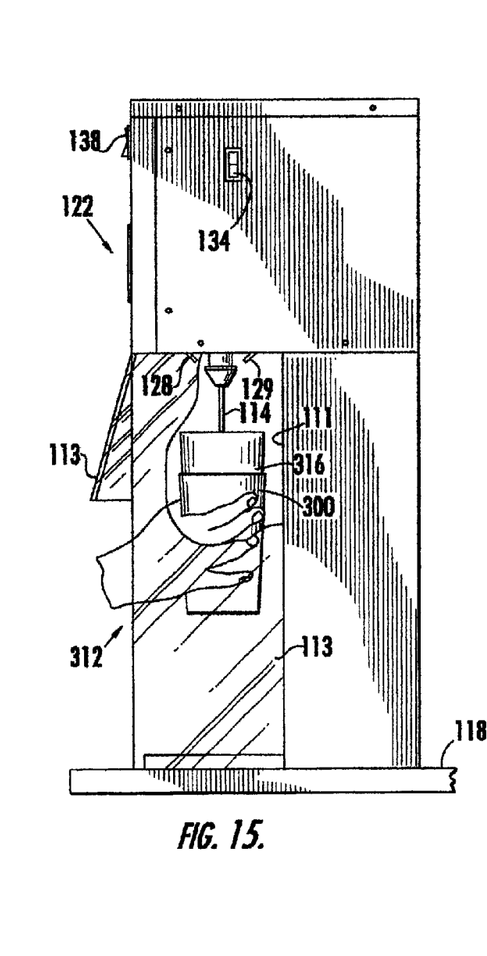
FIG. 15 is a side view of the apparatus of FIG. 13 illustrating a blending operation.

In operation of a preferred embodiment of the present invention, and as again illustrated with reference to FIGS. 12 and 15, the system 10' anticipates the storing of a multiplicity of flavored syrups 210 in bag-in-the-box styled reservoir bags 212 conveniently located, yet out of sight from a retail serving operation. The syrup 210, a variety of flavors including, by way of example, banana, cherry, chocolate, coffee, peppermint, raspberry, strawberry, and vanilla, each within its own designated bag 212, are in fluid communication with the corresponding nozzles 128 for dispensing of a selected syrup 210 from the nozzle 128 into the cup 300 hand held to receive the spindle 114 and thus the dispensed syrup 210. With the eight syrups 210 suggested by way of example, approximately thirty-six combination flavored shakes can be created by adding various portions of selected syrups 210 (e.g., standard button 124 selected, short button 123, long button 125, and combinations of buttons as desired), and dispensing the selected syrup 210 into the hand-held cup 300 containing the neutral-flavored shake mix 310. Once a particular flavor has been identified, an appropriate button 124 is pushed that causes the programmable timer 132, described earlier with reference to FIG. 17, to open the solenoid valve 126 corresponding to that selected syrup 210. The pump 216 dedicated to that syrup 210 causes the syrup 210 to flow from its individual bag 212 through conduit 214, 130, and 131 through the nozzle 128. As earlier described with reference to FIGS. 17 and 19, the nozzles 128 are arranged with each nozzle 128 directed at the spindle 114. In this way, a customized, multi-flavored shake is readied for blending into the shake of choice.

With the sleeve 316 placed within the selected cup 300, the work area and counter surface 118, as well as the cup 300 itself, are maintained in a clean, presentable condition for customer service. Once the blending is complete, the sleeve 316 is removed and the cup 300, now having a flavored shake of choice, is served to the customer within the cup 300 that was used for originally storing the neutral shake mix 310. Further, it is anticipated that the cup 300 containing the neutral-flavored mix 310 will be prepared and initially shipped and stored in a food freezer at temperatures for preserving the mix 310 for extended periods of time. Prior to the blending of a selected flavored syrup with the mix, the temperature of the mix will be reduced to a tempered temperature level for preferred blending of flavors with the mix. The tempering freezer 400, conveniently located proximate the blending and serving area, provides that tempering function.

With such a system 10', a cost-effective, health-conscious approach for preparing a flavored shake is provided. While specific method steps of the invention have been described in detail herein above, it is to be understood that various modifications may be made from the specific details described herein without departing from the spirit and scope of the invention as set forth in the appended claims.

As a result of the present invention, a cost-effective, health-code-conscious process fro providing a flavored food such as a slurried confection having a desired flavored is provided. While specific steps in the invention have been described in detail herein above, it is to be understood that various modifications may be made from the specific details described herein without departing from the spirit and scope of the invention as set forth in the appended claims. Having now described the invention, the construction, the operation and use of preferred embodiments thereof, and the advantageous new and useful results obtained thereby, the new and useful methods and reasonable equivalents thereof obvious to those skilled in the art, are set forth in the appended claims.

What is claimed is:

1. A method for preparing a flavored slurried confection, the method comprising the steps of:

providing a disposable serving container sufficiently sized for holding an individual serving of a slurried confection therein;

depositing a neutral flavored mix into the container, wherein the neutral flavored mix has a freezing point temperature lower than normally found for that of water;

storing the mix filled container within a storage freezer for maintaining the neutral flavored mix at a storage temperature;

maintaining the neutral flavored mix within the mix filled container at the storage temperature within the storage freezer;

transferring the mix filled container from the storage freezer to a tempering freezer for maintaining the neutral flavored mix at a blending temperature;

maintaining the neutral flavored mix within the mix filled container at the blending temperature within the tempering freezer;

removing the mix filled container from the tempering freezer for preparation of a flavored confection;

providing a plurality of flavored syrups;

manually positioning the mix filled container for pumping a selected syrup therein;

selecting a syrup from the plurality of flavored syrups;

pumping a quantity of the selected syrup into the mix filled container for blending the selected syrup with the neutral flavored mix;

blending the selected syrup with the neutral flavored mix while the mix remains chilled, whereby the quantity of syrup adds a selected flavor to the body and mass of the neutral flavored mix for forming the flavored slurried confection within the disposable serving container; and manually serving the flavored slurried confection for consumption within the disposable serving container.

* * * * *